United States Patent
Golla

(10) Patent No.: US 9,848,284 B2
(45) Date of Patent: Dec. 19, 2017

(54) PORTABLE MOBILE SUBSCRIPTION

(71) Applicant: STMicroelectronics, Inc., Coppell, TX (US)

(72) Inventor: Prasad Golla, Bridgewater, NJ (US)

(73) Assignee: STMICROELECTRONICS, INC., Coppell, TX (US)

( * ) Notice: Subject to any disclaimer, the term of this patent is extended or adjusted under 35 U.S.C. 154(b) by 0 days.

(21) Appl. No.: 14/839,761

(22) Filed: Aug. 28, 2015

(65) Prior Publication Data

US 2016/0088465 A1 Mar. 24, 2016

Related U.S. Application Data

(60) Provisional application No. 62/054,857, filed on Sep. 24, 2014.

(51) Int. Cl.
*H04W 4/00* (2009.01)
*H04W 12/04* (2009.01)
*H04W 8/20* (2009.01)
*H04W 72/04* (2009.01)

(52) U.S. Cl.
CPC .......... *H04W 4/008* (2013.01); *H04W 8/205* (2013.01); *H04W 12/04* (2013.01); *H04W 72/0493* (2013.01)

(58) Field of Classification Search
CPC ..... H04W 4/008; H04W 8/205; H04W 12/06; H04W 72/0493
See application file for complete search history.

(56) References Cited

U.S. PATENT DOCUMENTS

2004/0096062 A1* 5/2004 Oh ..................... H04L 63/0428
380/270
2008/0261561 A1* 10/2008 Gehrmann ............ H04W 8/205
455/411

(Continued)

OTHER PUBLICATIONS

Ericsson, "Types of emergency calls," TSG S1 (00) 101, Agenda Item:4.2.1, TSG-SA Working Group 1 (Services) meeting #7, Sophia Antipolis, France, Feb. 9-11, 2000, 6 pages.

(Continued)

*Primary Examiner* — Joseph Dean, Jr.
(74) *Attorney, Agent, or Firm* — Seed IP Law Group LLP

(57) ABSTRACT

A network services provider grants a subscription to a user for use of mobile network services to communicate voice, data, and text information with a specific mobile device. Mobile devices store one or more subscriptions, each of which may be activated. An activated subscription stored in the mobile device is now made portable. The user wants to pass the portable subscription from a first mobile device to a second mobile device. The user forms a first communicative relationship between the first mobile device and a second mobile device and receives from the second mobile device identification information associated with the second mobile device. The first mobile device passes the identification information to the network services provider and receives a confirmation. The user forms a second communicative relationship between the first mobile device and the second mobile device, and the second mobile device confirms activation of the portable subscription.

19 Claims, 4 Drawing Sheets

(56) References Cited

U.S. PATENT DOCUMENTS

| | | | | |
|---|---|---|---|---|
| 2008/0292076 | A1* | 11/2008 | Krishnamurthy | H04M 3/428 379/114.05 |
| 2009/0036126 | A1 | 2/2009 | Morikuni et al. | |
| 2010/0063889 | A1* | 3/2010 | Proctor, Jr. | G06Q 30/0623 705/21 |
| 2012/0108204 | A1 | 5/2012 | Schell et al. | |
| 2013/0157563 | A1* | 6/2013 | Jain | H04B 5/0031 455/41.1 |

OTHER PUBLICATIONS

Extended European Search Report, dated Feb. 24, 2016 for EP Application No. 15184295.2-1854, 14 pages.

"$3^{rd}$ Generation Partnership Project; Technical Specification Group Services and System Aspects; Telecommunication management; User Data Convergence (UDC); Common Baseline Information Model (CBIM); (Release 9)," Technical Specification, 3GPP TS 32.182 V1.0.0, Dec. 2009, 12 pages.

"3rd Generation Partnership Project; Technical Specification Group Core Network and Terminals; Characteristics of the Universal Subscriber Identity Module (USIM) application (Release 11)," Technical Specification, 3GPP TS 31.102 V11.6.0, Sep. 2013, 230 pages.

Byford, "Wearable tech could replace your SIM card," dated Jun. 10, 2014, retrieved from http://www.theverge.com/2014/6/10/579202 . . . , retrieved on Aug. 22, 2015, 3 pages.

"Digital cellular telecommunications system (Phase 2+); Universal Mobile Telecommunications System (UMTS); Numbering, addressing and identification (3GPP TS 23.003 version 12.4.1 Release 12)," Technical Specification, ETSI TS 123 003 V12.4.1, Oct. 2014, 92 pages.

"Digital cellular telecommunications system (Phase 2+); Universal Mobile Telecommunications System (UMTS); LTE; Mobile radio interface Layer 3 specification; Core network protocols; Stage 3 (3GPP TS 24.008 version 12.7.0 Release 12)," Technical Specification, ETSI TS 124 008 V12.7.0, Oct. 2014, 704 pages.

\* cited by examiner

PORTABLE MOBILE SUBSCRIPTION

BACKGROUND

Technical Field

The present disclosure generally relates to mobile network services and subscriptions for the services granted by network service providers to individual users. More particularly, but not exclusively, the present disclosure relates to a user being able to pass permission for the subscribed services between a plurality of devices.

Description of the Related Art

Network service providers, otherwise known as mobile network operators (MNO's), manage mobile network infrastructures. The mobile network infrastructure permits a user (i.e., a "subscriber") with a mobile device to make voice calls, send and receive data, and pass text messages to other computing devices. The other computing devices can be telephones, computer servers, mobile devices, handheld devices, tablets, wearables, machine-to-machine devices, Internet of Things (IoT) devices, or other connected devices that receive or otherwise subscribe to network-provided services. In a conventional mobile network system, a one-to-one relationship is created between the network service provider and the particular mobile device owned or otherwise operated by a single subscriber.

Generally, a network service provider will provision a subscriber identity module (SIM) associated with or stored in the memory of a particular mobile device for operation on its mobile network. The provisioning operation entails creating a subscription in the mobile device and associating the subscription, in computing hardware operated by the network service provider, with a set of services contracted for by the subscriber. As used herein, a "subscription" may interchangeably also be referred to as a "profile."

After the mobile device is provisioned, when a user desires to camp onto the network, the device will attempt to attach to the network by sending an activation request. In response, the network service provider sends an authentication challenge to the mobile device, or specifically to the SIM, which uses the challenge and the provisioned credentials to create a unique authentication result. The mobile device sends the unique authentication result back to the network service provider. The network service provider locally computes the authentication result to compare the received result with the calculated result before allowing the user to access the services. If the two results are identical or otherwise validated, the mobile device is activated.

Subsequently, when the subscriber desires to use the services, the particular mobile device will wirelessly transmit its device identifier and additional information from the active subscription to a computing device managed by the network service provider. The network service provider's computing device verifies the device identifier, and in some cases additional information, before permitting the particular mobile device to access the services. If the particular mobile device is requesting use (e.g., a voice call, an Internet session, or a text message) of a contracted service, then access is granted. If the service is not permitted, then access to the service is withheld.

A network service provider may have relationships with hundreds, thousands, or millions of individual users, also known as subscribers. For each subscriber, the network service provider activates a subscription, which is stored in the SIM associated with the mobile device or stored in the subscriber's mobile device memory.

When a network service provider determines that services should be denied or otherwise withheld, for example, if a user has failed to pay for service or lost the particular mobile device, the network service provider will deactivate the subscription associated with the particular mobile device.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

In accordance with some embodiments described herein, a subscription attached to a set of mobile network services is transportable from one mobile device to another. In some cases, the subscribed services are only available on a single mobile device at any one time; in other cases the subscribed services may be available concurrently on two or more devices. The subscribed services include one or more of voice communications, data communications, such as the Internet and electronic mail, text messaging services, mobile payment services, banking and other financial transaction services, voting services, active/passive subscriptions of partner/other MNO's, and still other services.

The mobile network provider grants permission to subscribers to access the contracted services. The set of permissions is associated with an activated subscription. It is possible to have multiple active subscriptions associated with only a single mobile device. In the system described in the present disclosure, a set of permissions is transportable from one mobile device to one or more other mobile devices.

A method to share a subscription for mobile network service between a first mobile device and a second mobile device, the subscription associated with a set of subscriber services provided by a network services provider, the subscription activated in the first mobile device, may be summarized as including: forming a first communicative relationship between the first mobile device and the second mobile device; wirelessly receiving at the first mobile device from the second mobile device, identification information associated with the second mobile device; passing the identification information associated with the second mobile device and a deactivation request from the first mobile device to the network services provider; receiving at the first mobile device a network services provider, confirmation that access to the subscription will be deactivated; forming a second communicative relationship between the first mobile device and the second mobile device; wirelessly communicating activation information associated with the second mobile device from the first mobile device to the second mobile device; and confirming activation of the subscription in the second mobile device.

The set of subscriber services may include communication of at least one of voice information, data, or text messages. The first and second mobile devices may be in a master slave relationship and the first mobile device may be a master. The subscription may include information stored in the first mobile device on a subscriber identity module (SIM) card. The first mobile device may be a smartphone and the second mobile device may be at least one of a smart watch, a portable media device, a smart device integrated in a motor vehicle, and a second smartphone. The first communicative relationship and the second communicative relationship may be formed as near field communication (NFC) communicative relationships. The first communicative relationship and the second communicative relationship may provide an indication to a user that the subscription is being transferred. The identification information associated with the second mobile device may be at least one of an integrated circuit card identifier (ICCID), an International mobile subscriber or station identity (IMSI), and a mobile subscriber integrated services digital network number (MSISDN).

The method to share a subscription for mobile network service between a first mobile device and a second mobile device, the subscription associated with a set of subscriber services provided by a network services provider, the subscription activated in the first mobile device, may include: receiving at the first mobile device from the network services provider the activation information associated with the second mobile device, wherein the activation information includes at least one challenge value formed by the network services provider using at least some of the identification information associated with the second mobile device; and passing the challenge value from the first mobile device to the second mobile device via the second communicative relationship.

The method to share a subscription for mobile network service between a first mobile device and a second mobile device, the subscription associated with a set of subscriber services provided by a network services provider, the subscription activated in the first mobile device, may include: performing an algorithm at the second mobile device using at least some of the activation information associated with the second mobile device to produce an authentication result; and passing the authentication result and an activation request from the second mobile device to the network services provider.

A mobile network operator (MNO) system may be summarized as including: an MNO communication device, the MNO communication device arranged to communicate with a first mobile device and a second mobile device wherein communicated information includes: a deactivation request from the first mobile device, the deactivation request associated with transfer of a portable subscription from the first mobile device to the second mobile device, the portable subscription associated with a set of subscriber services provided by the MNO; identification information associated with the second mobile device; confirmation information to the first mobile device indicating that the portable subscription will be deactivated at the first mobile device; authentication challenge information for the second mobile device formed using the identification information associated with the second mobile device; an activation request from the second mobile device, the activation request associated with transfer of the portable subscription from the first mobile device to the second mobile device, the activation request including authentication result information from the second mobile device formed using the authentication challenge information; and confirmation information to the second mobile device indicating that the portable subscription will be activated at the second mobile device.

The identification information associated with the second mobile device may be at least one of an integrated circuit card identifier (ICCID), an International mobile subscriber or station identity (IMSI), and a mobile subscriber integrated services digital network number (MSISDN). The communicated information may include confirmation information to the first mobile device indicating that the portable subscription will be deactivated at the first mobile device and activated at the second mobile device. The communicated information may include data communicated from the second mobile device through the MNO system to another mobile device. After the portable subscription is transferred from the first mobile device to the second mobile device, the first mobile device may be only enabled to access emergency services of the MNO system.

A non-transitory computer-readable storage medium whose stored contents configure a mobile device to perform a method may be summarized as including transferring a portable subscription from a first mobile device to a second mobile device, the portable subscription associated with a set of subscriber services provided by a network services provider, the portable subscription including portability information stored in a security module of the first mobile device.

The non-transitory computer-readable storage medium whose stored contents configure the mobile device to perform the method may further include: forming a first communicative relationship between the first mobile device and a second mobile device; wirelessly receiving at the first mobile device from the second mobile device, identification information associated with the second mobile device; and passing the identification information associated with the second mobile device to a the network services provider.

The non-transitory computer-readable storage medium whose stored contents configure the mobile device to perform the method may further include: forming a second communicative relationship between the first mobile device and the second mobile device; wirelessly communicating activation information associated with the second mobile device from the first mobile device to the second mobile device; and confirming de-activation of the portable subscription in the first mobile device.

The first mobile device may be a smartphone. The security module may be a subscriber identity module (SIM) card.

These features with other objects and advantages which will become subsequently apparent reside in the details of construction and operation as more fully described hereafter and claimed, reference being had to the accompanying drawings forming a part hereof.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

The disclosure herein describes processes, machines, and articles of manufacture that service vast multitudes of users and improve the functioning of computing devices and systems where embodiments of those devices are operating. When using these devices, mobile network operators (MNO), also known as mobile network service providers, can add value to their existing offerings by permitting subscribers to transfer or share one telephone number amongst a plurality of devices instead of tying a telephone number to only a single device as in conventional offerings. That is, instead of requiring every mobile device to carry its own unique, activated subscription, the present disclosure describes systems, devices, and methods to share or transfer a single activated subscription from one mobile device to another mobile device.

Figure 1:
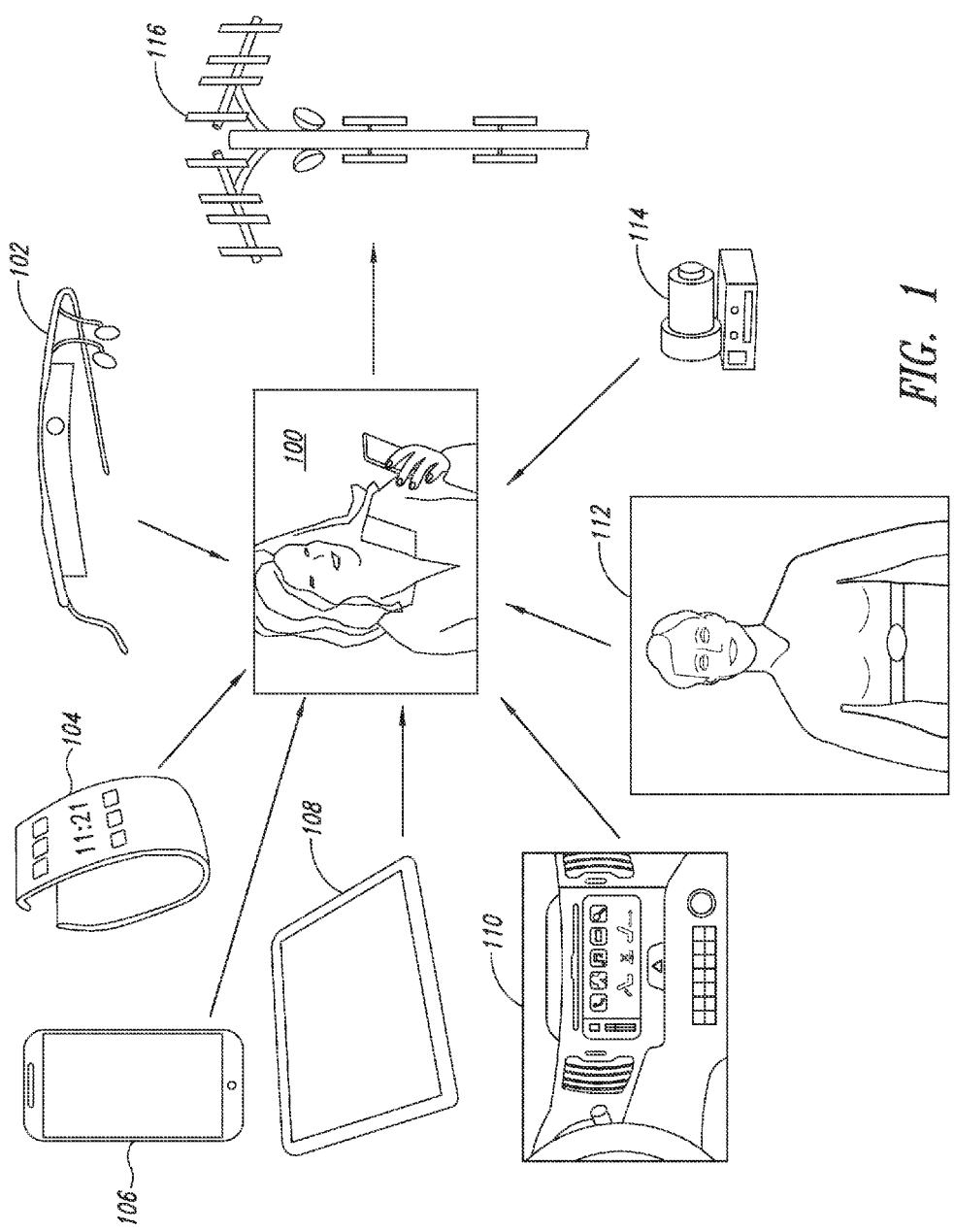
FIG. 1 illustrates a user and a variety of mobile devices that may be operated by the user.

FIG. 1 illustrates a user 100 and a variety of mobile devices that may be operated by the user. In the illustration, a set of face-wearable glasses 102 with an integrated computing device is shown. Another wearable device 104 has a wrist-watch or wrist-wearable form factor housing with an integrated computing device, though wearable smart devices may also be formed as bracelets, necklaces, or any other type of accessory or clothing. A smartphone 106, a portable media device such as a tablet 108, a motor vehicle dashboard 110 (e.g., car, truck, motorcycle, train, plane, boat, or the like), and an exercise equipment platform 112 are also illustrated in FIG. 1 along with an industrial device 114. The smart industrial device 114 may also be known as an Internet of Things (IoT) device, and such devices include, but are not limited to, a factory machine, a utility meter (e.g., gas meter, electricity meter, water meter, or the like), a commercial sign, a public service device (e.g., light pole, traffic camera, safety device, such as a walk sign or roadway barrier, or any other public service device), or nearly any other industrial device that communicatively sends or receives network data.

In one manner or another, each of the computing devices of FIG. 1 may be operated by the user or some other subscriber entity in communication with one or more mobile network operator (MNO) communication devices 116 such as a cell tower, a repeater, an antenna, a base station system (BSS), a mobile switching center (MSC), a gateway MSC (GMSC), a network switching subsystem (NSS), an authentication center (AuC), a home location register (HLR), a visitor location register (VLR), an equipment identity register (EIR), a service control point (SCP), a short message service center (SMSC), and other such devices recognized by one of skill in the art and not discussed herein for brevity. Collectively, the MNO communication devices 116 provide mobile network services. That is, each device includes some form of wireless communication transceiver capable of communicating through the illustrated mobile network hardware operated by a mobile network service provider (i.e., the MNO) with some other communication device.

Depending on their particular need or desired use, the user 100 in FIG. 1 may operate one or more of the illustrated devices and other mobile devices not illustrated. In conventional systems, each of the devices, in order to operate in its intended full-feature configuration, will have an activated subscription with one or more network service providers. The activated subscription is associated with a particular subscriber and with a set of mobile network services that the mobile network service provider contractually permits the user to access. The activated subscription may also be known as a mobile subscription, a subscription for mobile services, a profile, or some other like term.

In view of the illustrations of FIG. 1, the current inventor has recognized that the particular user 100 may desire to access the contracted mobile network services on a plurality of different devices at different times. Using today's conventional technology, the user 100 could separately subscribe to services for each of the devices. Alternatively, the user 100 may physically transfer a subscriber identity module (SIM) from one device to another. For example, the user 100 may remove a SIM from a smartphone 106 and insert the SIM into tablet 108, exercise equipment 112, a smart automobile device 110, or any other smart device. Alternatively, and as discussed herein, each of the computing devices may be improved, along with the life of user 100, if a subscription for mobile network services could be portable and easily moved from one device to another. Thus, as used herein, a portable subscription encompasses a transfer of permission to access network services from one mobile device to another mobile device.

The discussion of a portable subscription feature with respect to a consumer's use of multiple mobile devices represents only one set of non-limiting embodiments, and different uses are also contemplated. For example, in an Internet of Things (IoT) embodiment, a single subscription may be portably transferred to a sequence of smart utility meters by service personnel carrying a mobile device to each meter. A single subscription may be transferred back and forth from a work-piece to various industrial machines in a factory embodiment as the work-piece travels down an assembly line. A subscription may also be transferred between mobile devices in other circumstances.

Figure 2:
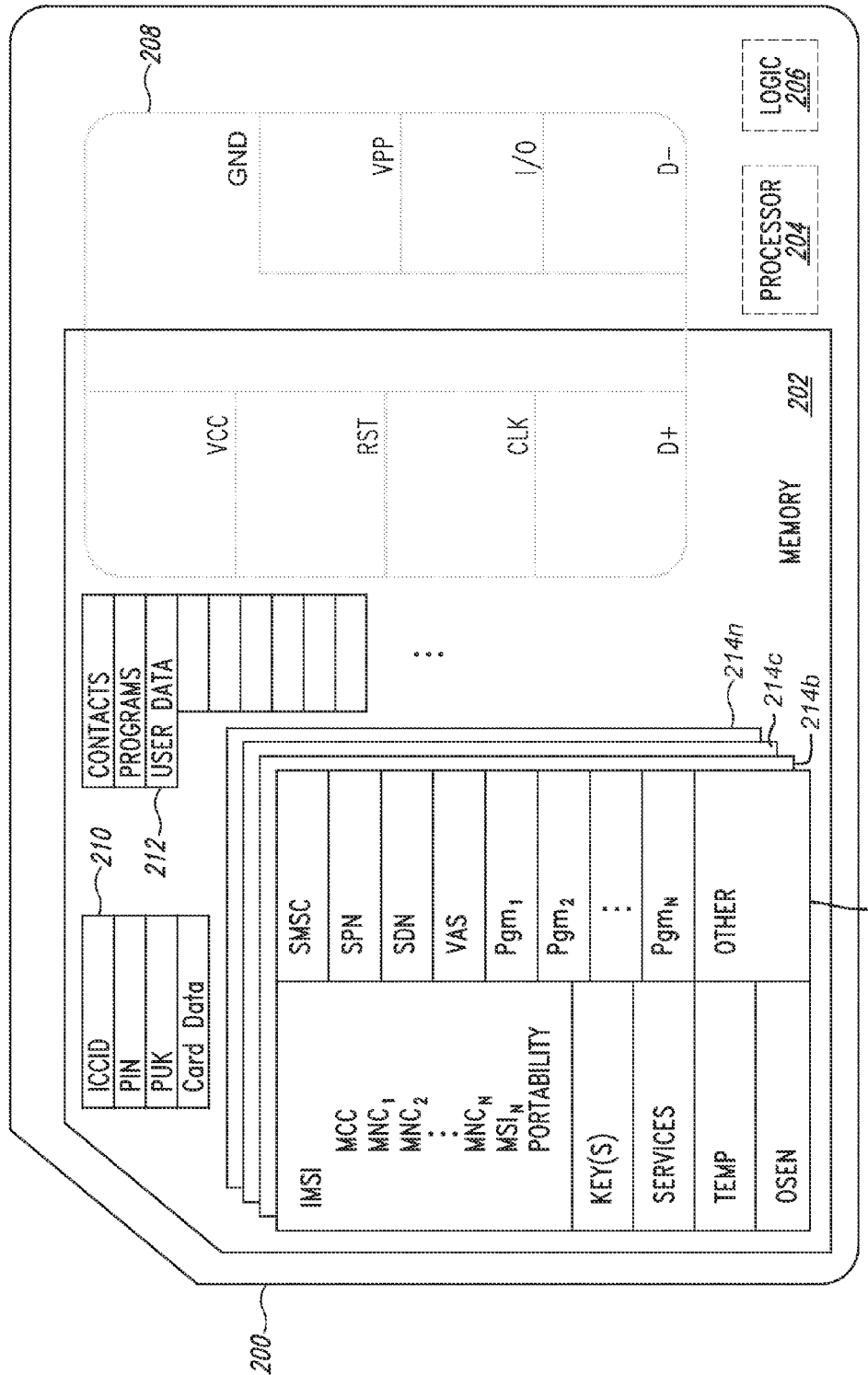
FIG. 2 is a subscriber identity module (SIM) embodiment.

FIG. 2 is a non-limiting subscriber identity module (SIM) embodiment 200. The SIM of FIG. 2 is coupled to or otherwise integrated in a particular mobile device such as one of the devices of FIG. 1. The activated subscription includes information that is securely stored in the SIM, which is associated with the mobile device.

The SIM of FIG. 2 is exemplary only. That is, in some cases, the information is stored in a subscriber identity module (SIM) card, but in different cases, the information is stored in some other security module such as an embedded memory, a memory in a dongle, a memory connectable (e.g., pluggable) into the mobile device through an interface, or in some other configuration. For simplicity in this disclosure, however, the SIM of FIG. 2 is considered.

SIM 200 in FIG. 2 is embodied as a small, square or rectangular device having one truncated corner, but other form factors are considered. The SIM 200 has an integrated memory device 202, and in some cases, the SIM card may also have limited or significant computing functionality. In this respect, the SIM 200 of FIG. 2 is illustrated with an optional processor 204 and at least one optional logic module 206. It is recognized, however, in the alternative or in addition, that processor 204 and logic module 206 may be implemented as a processor and logic module of the mobile device to which the SIM 200 is associated. Stated differently, in some embodiments, a SIM 200 includes one or both of an integrated processor 204 and an integrated logic module 206. In other embodiments, computing and logic features of SIM 200 are performed by one or both of an external processor 204 and an external logic module 206 (e.g., integrated in the mobile device). In still other embodiments, SIM 200 and the external device may both include processors, logic circuits, and other features. In this case, the processor 204 and logic module 206 of FIG. 2 represent that either processor may perform the computing functions associated with SIM 200 and described herein, and either logic module may perform the logic functions associated with SIM 200 and described herein.

The particular shape, electronic pin configuration, and operational characteristics of the SIM 200 are generally governed by one or more standards such as the Global System for Mobile Communications (GSM) mobile communications standards. As illustrated in FIG. 2, SIM 200 includes a mobile device interface 208 having eight pins. The eight pins include a voltage source $V_{CC}$, a reset RST, a clock CLK, first and second USB differential pints D+, D−, an input/output I/O, a programming voltage source $V_{PP}$, and a ground reference GND. Other interfaces, such as buses, are contemplated. In SIM 200, the mobile device interface 208 provides a mechanism by which the SIM 200 may be provisioned, accessed, or otherwise functionally utilized by a mobile device.

Memory 202 includes a plurality of storage cells wherein data associated with SIM 200 and an associated mobile device may be stored. The various structures of memory 202 illustrated in FIG. 2 are exemplary and are provided for simplifying the discussion. Many other structures are contemplated and more or fewer datums may be stored in said structures.

A first memory structure 210 stores SIM-centric information; a second memory structure 212 stores user-centric information, and a third memory structure stores portable subscription-centric (e.g., profile-centric) information. The third memory structure of FIG. 2 is collectively illustrated as a plurality of memory structures 214a, 214b, 214c, 214n. In the discussion herein, one of the plurality of third memory structures 214a is discussed for simplicity. Nevertheless, it is recognized that the principles, concepts, and other features discussed with reference to third memory structure 214a may be similarly applied to any number of other third memory structures including third memory structures 214b to 214n.

The first memory structure 210 is illustrated with four fields including an ICCID field, a PIN field, a PUK field, and a Card Data field.

The integrated circuit card identifier (ICCID) is an internationally unique identification number for SIM 200. In many cases, the ICCID is also permanently printed, engraved, or otherwise marked on the body of the card when SIM 200 is personalized; sometimes as part of a manufacturing operation and sometimes when the card is distributed by a card issuing entity. The ICCID is defined by the International Telecommunications Union Telecommunications Standardization Sector (ITU-T) as a primary account number. The ICCID is currently a unique number having up to 22 digits, including a single check digit calculated by a data verification formula such as the Luhn algorithm or another modulus 10 algorithm. A PIN is a personal identification number, and a PUK is a personal unblocking code to unlock the PIN if necessary. The Card Data field may include any number of bytes. Card Data in some cases includes specific information associating the card with a portable subscription.

The second memory structure 212 is illustrated with a Contacts field, a Programs field, a User Data field, and a plurality of other fields. Each of the fields may be of any size. The amount of memory available on SIM 200 may be small or large. Accordingly, in some cases, the second memory structure 212 is zero bytes long indicating that the user may not store any contacts, programs, or other data on SIM 200. In other cases, the second memory structure 212 is many thousands or millions of bytes long indicating that the user may store hundreds or thousands of contacts, many software programs executable by processor 204, and a large quantity of user data. In some cases, the User Data field or other fields of the second memory structure 212 includes specific information associated with a portable subscription.

The third memory structure 214a includes information associated with a subscription (i.e., a profile). Information associated with a plurality of subscriptions stored respectively in third memory structures 214a to 214n are illustrated in FIG. 2, but more or fewer may be integrated in various embodiments.

Exemplary subscription information stored in third memory structure 214a includes an IMSI field, a Key(s) field, a Services field, a Temp field, and an OSEN field. The third memory structure 214a also includes SMSC, SPN, SDN, and VAS fields along with fields for one or more programs (i.e., $Pgm_1, Pgm_2, \ldots Pgm_N$), and optionally Other information.

An International Mobile Subscriber (or Station) Identity (IMSI) field represents a unique subscription of a particular set of contracted services or an account with a network service provider (e.g., a mobile network operator (MNO)). Thus, a single IMSI number may be used to identify a particular subscription.

In a system defined by the International Telecommunications Union (ITU), for example, within 3GPP TS 23.003, Digital cellular telecommunications system (Phase 2+); Universal Mobile Telecommunication System (UMTS); Numbering, addressing and identification (version 12.4.1 Release 12), an IMSI number has up to 15 digits or sub-fields. In other systems, a different number of digits may also be implemented. The sub-fields of the IMSI include a Mobile Country Code (MCC) value that uniquely identifies a country of domicile associated with the subscription, one or more Mobile Network Codes (MNC) that identify a home public land mobile network (PLMN), and a Mobile Subscriber Identification Number (MSIN) that identifies a mobile subscription within a PLMN. Another IMSI sub-field illustrated in FIG. 2 is a Portability sub-field. In the exemplary embodiment, the Portability sub-field may be used to identify a particular device to which the subscription is attached.

One or more authentication Keys are stored in the third memory structure 214a. In one case, a key is a 128-bit value used to authenticate a subscription within a network. The MNO or an MNO-authorized entity also stores a copy of the key(s) that are stored in memory 202 of the SIM 200. Using such a key, a subscription may be permitted or denied access to network services. For example, in one case, the mobile device requests activation on the MNO network by providing its IMSI number. The network recognizes the IMSI and sends challenge information to the device, which can include a number such as a random number. The mobile device uses a Key value stored in the third memory structure 214a to create a result, which is sent back to the MNO. The MNO performs the same calculation on the challenge number sent to the mobile device using its copy of the key. If the MNO calculates the same result that was returned by the mobile device, the mobile device is authorized to use the services associated with the subscription. Alternatively, if the MNO calculates a different result, the mobile device is denied access to network services.

Additional information may also be included in the subscription of third data structure 214a. Services data may represent a set of network services that are associated with the subscription and available to the mobile device. Roaming, data throughput, data volume, and other services may be included.

Temporary data may be stored when a subscription is activated on a particular mobile network. In one example, the Temporary data is used by a transceiver of the mobile device to expedite access to particular services by storing a Local Area Identity (LAI), a current or most recent tower ID, location ID, or other "current" information associated with access to network services.

An Operator-Specific Emergency Number may be stored in the subscription of third data structure 214a along with other network service provider specific data such as a Short Message Service Center (SMSC) number, a Service Provider Name (SPN), Service Dialing Numbers (SDN), and Value Added Service (VAS) applications.

A plurality of SIM-specific programs $Pgm_1$, $Pgm_2$, ... $Pgm_N$ may also be stored along with Other associated data. In some cases, one or more of the programs $Pgm_1$, $Pgm_2$, ... $Pgm_N$, along with Portability or Other data, are used to implement the subscription portability features. The programs are executed by processor 204.

As discussed with respect to the third data structures 214a-214n, the IMSI field is exemplary in that it uniquely represents a subscription or a particular account within a mobile network. It is recognized that other identifiers may also be used to represent a portable subscription. One other such field that is contemplated is a Mobile Subscriber Integrated Services Digital Network Number (MSISDN), which is also defined in 3GPP TS 23.003, Digital cellular telecommunications system (Phase 2+); Universal Mobile Telecommunication System (UMTS); Numbering, addressing and identification (version 12.4.1 Release 12), and which also has up to 15 digits or sub-fields. As defined by the ITU, the MSISDN is formed by several sub-fields including a Country Code (CC), a National Destination Code (NDC) and a Subscriber Number (SN). Generally speaking, the MSISDN is the "telephone number" associated with the particular subscription stored on SIM 200.

Within the mobile network, the IMSI is used to identify a subscription based on its association with a specific mobile network operator, and the MSISDN is used to identify a subscription as a mechanism to route a mobile telephone call. A user (i.e., a subscriber) becomes a customer of a mobile network operator by purchasing or otherwise acquiring a SIM 200 having stored information associated with the MNO. The subscription is allocated an IMSI and an MSISDN. The IMSI is used to identify the subscription across the network by the operator, and the MSISDN is the number which is used for dialing. In some cases, a single MSISDN is associated with a single subscription. In other cases, a single MSISDN may be associated with multiple subscriptions stored in the same memory 202 of the same SIM 200. In this way, like the IMSI, the MSISDN may also be considered a unique subscription identifier.

As discussed herein, the unique subscription identifier may comprise an IMSI, an MSISDN, or some other value. Both the IMSI and MSISDN are now defined by the ITU to have up to 15 digits, though future IMSI and MSISDN values and other values may have different numbers of digits. Currently, the world has about 7 billion people. When current and future machine type communication (MTC) is considered within the Internet of Things (IoT), about 100 smart machines per person or 700,000,000,000 subscriptions are contemplated. In this respect, a 15-digit number is sufficient to uniquely identify and store all 12-digits of the 700 billion machines. Accordingly, even as mobile communications evolve, current and future uses of IMSI numbers, MSISDN numbers, and other unique subscription identifiers are considered within the present portable subscription concepts.

As discussed herein, SIM 200 of FIG. 2 is an exemplary case. In other cases, the information that, in whole or in part, comprises an activated or activatable subscription, is stored in a Universal Integrated Circuit Card (UICC). The UICC, which is not shown for simplicity, may be considered a newer generation SIM. The UICC is generally compatible with mobile communication systems that comply with 3G and 4G telecommunications standards as well as some non-GSM telecommunications standards. The UICC includes a computing processor, data storage memory, and executable software, which is often embodied in one or more applications that run on the computing processor. For example, a USIM application provides activated subscription functionality to identify the subscriber and associated contracted services to the mobile network services provider. A UICC is conventionally compatible with Universal Mobile Telecommunications Systems (UMTS), High Speed Packet Access (HSPA) systems, Long Term Evolution (LTE) systems, carrier detect multiple access (CDMA) systems, and other systems. The UICC may also provide applications for Intelligent SIM (ISIM) to secure mobile access to multimedia services and other non-telecom applications such as mobile payment services, financial services, banking services, private healthcare services, and the like.

In still other cases, an embedded mobile UICC (eUICC) device or some other logic in the mobile device includes the information and functionality to enable a user's activated subscription.

In order to transfer an activated subscription, the activated subscription is made portable. That is, a secure software application running on the mobile device cooperates with secure software running on one or more computing devices of the mobile network service provider to permit the information representing the activated subscription to move from one mobile device to another mobile device.

A security module in the mobile device such as SIM 200 includes a subscriber identity module Application Toolkit, also known as a SIM Toolkit or, commonly, a STK. The STK is a GSM standard system that enables the security module to initiate actions, which can be used by mobile network service provider to provide various value-added services.

The STK is represented by one or more processor executable commands programmed into the security module (e.g., the SIM 200), which define how the security module will interface with devices outside of the security module. The STK can operate independent from the applications processor and baseband processor of the mobile device where the security module is located. In cases where a security module includes a contactless interface, the STK can also in some cases operate when the mobile device has a "dead" battery.

The computer applications of an STK permit the security module to initiate, manage, control, or otherwise direct mobile network operations, security operations, display menus, user input, and still other operations of the mobile device.

In many cases, the STK is a single application resistant to hackers. Multiple functional "applets" may be included in an STK to provide expanded utility. In many cases, the STK begins executing when the mobile device first powers up. The STK operates in a secure environment of the security module. As discussed herein, the STK may be stored as Card Data in the first memory structure 210 of SIM 200, stored as Programs or User Data in the second memory structure 212, or stored as programs $Pgm_1$, $Pgm_2$, ... $Pgm_N$ in the third memory structures 214a-214n.

Figure 3:
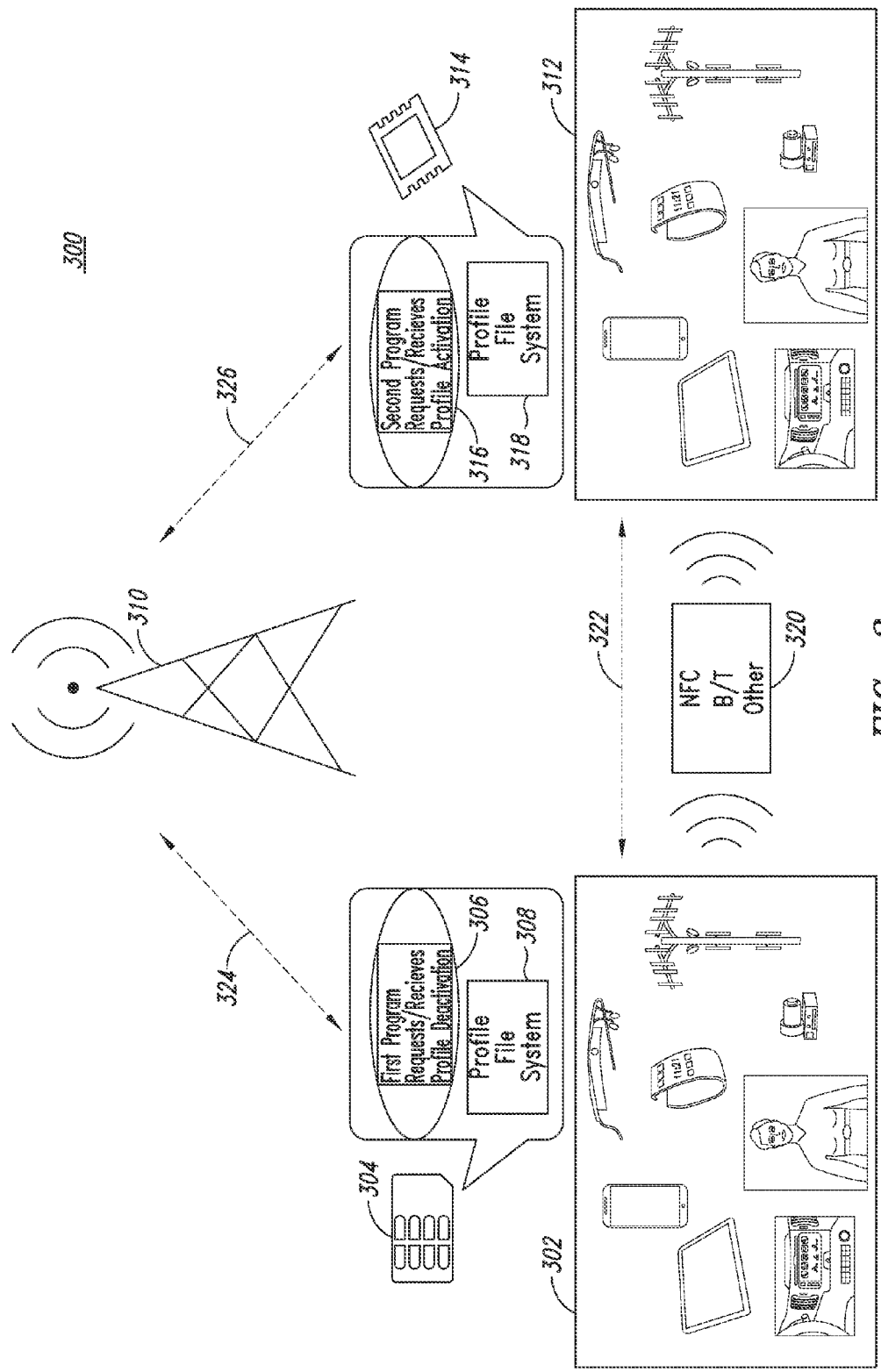
FIG. 3 illustrates an embodiment wherein a portable subscription (i.e., a transportable activated profile) is transferred from one mobile device to another.

FIG. 3 illustrates a first portable subscription transfer embodiment 300 wherein a portable subscription (i.e., a transportable activated profile) is transferred from one mobile device 302 to another mobile device 312. The first mobile device 302 has a security module 304 such as SIM 200 of FIG. 2. The security module 304 includes a first portable subscription transfer program 306 and first portable subscription information 308, which may be stored in the security module 304 as discussed with respect to SIM 200 of FIG. 2. Correspondingly, the second mobile device 312 also has a security module 314 that stores a second portable subscription transfer program 316 and second portable subscription information 318, which may be understood as discussed with respect to SIM 200 of FIG. 2. The first mobile device 302 may bi-directionally communicate with the mobile network service provider 310 as represented by first device to MNO communications 324. The second mobile device 312 may bi-directionally communicate with the mobile network service provider 310 as represented by second device to MNO communications 326.

In the first portable subscription transfer embodiment 300, a particular set of instructions is present in the STK to manage the portable subscription. Also in the embodiment, the mobile devices amongst which the portable subscription is transferred have a secure contactless interface with an associated transceiver. Considering SIM 200 of FIG. 2, the mobile devices may represent subscription information in memory 202 and the contactless interface may be embodied in the logic module 206.

In the first portable subscription transfer embodiment 300 of FIG. 3, the secure contactless interface is illustrated as a near field communication (NFC) system, but other interfaces are contemplated. For example, the secure contactless interface may have underlying radio frequency identification (RFID) logic, Bluetooth logic, low energy Bluetooth (BLe) logic, IEEE 802.11 (WiFi) logic, or some other like infrastructure. In some cases, the underlying logic (i.e., circuitry, software, protocols, and the like) conforms to parameters established by a standard setting body. In other cases, the underlying logic conforms to a proprietary interface.

In the first portable subscription transfer embodiment 300 of FIG. 3, the first mobile device 302 has an activated subscription and operates as a master. The second mobile device 312 where the activated subscription will be transferred to operates as a slave. Both the master and slave devices are executing an STK that is aware of the portability of the activated subscription.

In a first act, the master mobile device 302 taps the slave mobile device 312. A first communicative relationship 322 is formed. The NFC protocol detects the tap and recognizes the tap as a possible first action to transfer an activated subscription 320. The detection may be based on the slave mobile device 312 not having an activated subscription, or the detection may be based on information transferred to the slave mobile device 312 in the first tap. Alternatively, the detection may be based on a user input, a mobile network service provider input, or some other circumstance. In embodiments without a secure contactless interface, one or more parts of the activated subscription transfer may be guided by user input prompted from a displayed menu, an audio queue, a tactile signal such as vibration, or some other prompt signaling a first action to transfer an activated subscription 320.

In response to the first act, information about the slave mobile device 312 is optionally captured by the master mobile device 302. The information may be sent in an NFC packet as part of the first formed communicative relationship. Alternatively, the information may be passed to the master mobile device 302 or entered in the master mobile device 302 in another way. The optional information is typically some type of a unique identifier to the slave mobile device 312. The unique identifier may be an integrated circuit card identifier (ICCID) number, an International mobile station equipment identity (IMEI) number, a mobile equipment identifier (MEID) number, an International mobile subscriber identity (IMSI) number, a mobile subscription identification number (MSIN), a Mobile Station International Subscriber Directory Number (MSISDN), or some other identifier.

After the first act, the STK in the master mobile device 302 may provide an output to indicate to the user that an activated subscription transfer process has been initiated. The output can be a displayed message, a light source illuminated with a particular pattern, an audio output such as a beep, or some other indication.

In a second act, the master mobile device 302 will send a request to the mobile network service provider 310. The request includes information to deactivate the activated subscription of the master mobile device 302 and information to activate the subscription of the slave mobile device 312. The mobile network service provider 310 will respond to the request of the master mobile device 302.

In some cases, a third act includes the mobile network service provider 310 sending an encrypted packet of information back to the master mobile device 302. The encrypted packet can only be decrypted by the slave mobile device 312, which has stored in its own associated security module particular keys to decode the packet.

When the encrypted packet arrives at the master mobile device 302, the user can be alerted. The alert may be a menu or other displayed message, an audio or tactile indication, or some other indication. Alternatively, the user of the master device may merely wait for a short time such as 1 second or 10 seconds and proceed with the process.

A fourth act of the process to transfer an activated subscription from the master mobile device 302 to the slave mobile device 312 is illustrated in FIG. 3 as another portable subscription transfer initiation event 320 (e.g., device tap) to engage the NFC hardware. By this second tap, a second communicative relationship 322 is formed between the master and slave devices wherein information can again be transferred between the devices. In cases where a non-NFC interface is employed such, as WiFi or Bluetooth, the fourth act may be seamless to the user. That is, the user may not be aware that the fourth act is underway.

In the fourth act as described herein, the encrypted information received by the master mobile device 302 from the mobile network service provider 310 is transferred to the slave mobile device 312. Upon transfer, the STK on the slave mobile device 312 will decrypt the packet and begin a registration process with the computing devices of the mobile network service provider 310. The slave mobile device 312 may communicate with the mobile network service provider 310 first or the mobile network service provider 310 may communicate with the slave mobile device 312 first. In cooperation with the fourth act, the activated subscription in the slave mobile device 312 governs access to the services of the mobile network service provider 310.

According to a fifth act, the mobile network service provider 310 will send subscription deactivation information to the master mobile device 302. After the deactivation information is sent, the master mobile device 302 will no longer have an activated subscription, and the master mobile device 302 will no longer be able to access the mobile network services contracted according to the user's subscription. Instead, the set of mobile network services are only available to the slave mobile device 312.

The fifth act in the first portable subscription transfer embodiment 300 is optional. In many cases, the mobile network service provider 310 will only permit one mobile device at a time to access mobile network services. Alternatively, in some cases, the mobile network service provider 310 will grant or contract a particular user to concurrently access mobile network services with two or more devices. When a mobile network service provider permits two or more devices to concurrently maintain activated subscriptions, user input or some other mechanism may be employed to determine whether or not the master device remains activated.

A particular use case is now described. In the exemplary case, a user 100 is taking personal time for vacation, jogging, or some other purpose. The user 100 has determined that carrying two or more mobile devices is uncomfortable, bulky, or otherwise undesirable. On the other hand, the user 100 would like access to a rich set of mobile network services that are available on the user's smartphone 106. The services are available because the user has contracted with a mobile network service provider 310 and subscribed to a particular set of mobile network services. In the example, the user 100 taps the smartphone 106 against a smart watch 104. The smartphone 106 and smart watch 104 both have a cooperative wireless interface such as NFC, Bluetooth, WiFi, or some other interface. Via a series of seamless information exchanges between the devices, the activated subscription from the smartphone 106 is transferred to the smart watch 104, and the user 100 is free to enjoy the bulk-free, comfortable personal time.

The use case exemplified above with respect to the user 100 transferring a portable subscription from a smartphone 106 to a smart watch 104 is now described in more detail.

Figure 4:
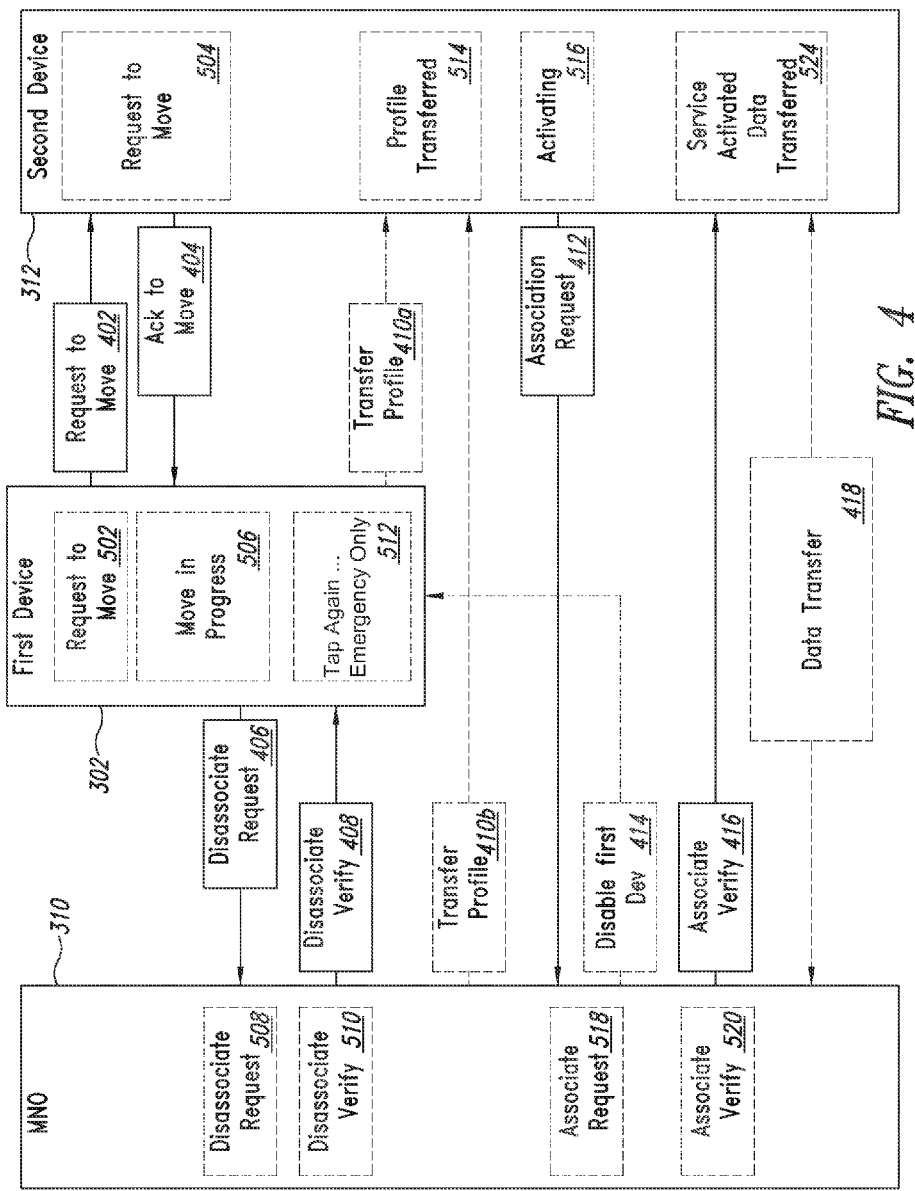
FIG. 4 is a flowchart that illustrates an exemplary transfer of an activated subscription from one mobile device to another mobile device.

FIG. 4 is a flowchart that illustrates an exemplary transfer of an activated subscription 400 from a first mobile device 302 to a second mobile device 312. In the embodiment, the first mobile device 302 has an activated subscription with a mobile network operator (MNO) such as mobile network service provider 310. Optionally, the second mobile device 312 may also have an activated subscription with the MNO. In such case, when the first mobile device 302 subscription is transferred to the second mobile device 312, the previously active subscription of the second mobile device 312 may be suspended, deactivated, or unaffected. For example, prior to the transfer, if the second mobile device has an activated subscription with a different MNO, the different subscription may remain active. As another example, if the activated subscription of the first mobile device has different available mobile network services from the activated subscription of the second mobile device 312, the MNO may choose to temporarily grant the services available to the first mobile device to the second mobile device without deactivating or otherwise transferring a subscription.

Turning back to the exemplary transfer of the activated subscription 400 of FIG. 4, in a first act 402, the user of a smartphone first mobile device 302 opens the application to move the wireless network services subscription from the smartphone to the smart watch second mobile device 312. A display or another user interface on the smartphone may indicate the request to move the subscription at 502. The application can be initiated as typical user application on a smartphone such as with particular key presses or touch screen actions. Alternatively, the application may be initiated in another way. For example, the tapping of the smartphone on the watch may engage the NFC interface of both devices. A first communicative relationship is formed and a request to transfer data occurs between the first smartphone and the smart watch. Correspondingly, a display or another user interface of the smart watch may optionally indicate the request to move the subscription at 504.

In a second act 404 of FIG. 4, the smart watch responds to the smartphone to acknowledge the process of transferring the subscription. Optionally in the acknowledgement, the smart watch may send an ICCID, MSISDN, or some other identifier to the smartphone. The smart watch may also send a set of capabilities to the smartphone. The set of capabilities may include indicators representative of wireless baseband hardware, data speed, voice communication abilities, user input/output functionality, memory space, codec (encoder/decoder) capabilities, and the like. The information communicated during the first communicative relationship of the first and second acts may be encrypted, un-encrypted, or some combination thereof. Upon receipt of the acknowledgement, the first mobile device 302 smartphone may indicate to a user that the subscription transfer is in process at 506 via the smartphone's user interface.

A third act 406 illustrated in FIG. 4 includes communication between the smartphone and the mobile network service provider 310. In the third act 406, the smartphone sends a request to disassociate the active subscription of the current security module. Optionally, the request to disassociate may also include a request to attach the active subscription to the security module of the second mobile device 312 smart watch. If the optional request to activate the smart watch is made by the smartphone to the mobile network service provider, the smartphone will include some or all of the information gathered from the smart watch in the second act 404. That is, the request to disassociate the active subscription will include the unique identifier of the smart watch and may also include some or all of the capabilities of the smart watch. In some cases, it is further recognized that the request to disassociate the active subscription of the smartphone may also be optional because in some cases, the mobile network service provider may permit two or more devices to concurrently maintain an activated subscription.

Upon receiving the disassociation request at 406, the mobile network service provider 310 may optionally verify that the smartphone has an activated subscription and that the request to disassociate was properly formed at 508. The MNO may also perform other internal acts at 510 such as verification that the identifier of the smart watch is valid, adjusting accounting information, and the like. The mobile network service provider 310 may also verify more or less information.

In a fourth act at 408, the MNO verifies the disassociation of the smartphone by sending disassociation information back to the smartphone. Optionally, using the unique identifier of the smart watch, the mobile network service provider 310 may also form an encrypted activation packet directed to the smart watch. The mobile network service provider 310 may use the unique identifier as a seed value for the encryption. Alternatively, the mobile network service provider 310 may use other information that was previously gathered about the smart watch, publicly available about the smart watch, or determined in another way. In these cases, the encrypted activation packet may be sent back to the smartphone at 408 with the disassociation verification or in a separate packet. Upon receipt of the disassociation verification, the smartphone may indicate to a user that the first mobile device 302 is only available for emergency calls.

A fifth act 410A optionally commences with receipt of the encrypted packet from the mobile network service provider 310 at the smartphone. The STK of the smartphone will receive and process the message from the mobile network service provider 310. In some cases, a message is presented on the smartphone display requesting the user re-tap the smartphone to the smart watch at 512. In other cases, some other indication is provided to the user of the smartphone such as a tactile (e.g., vibration) or audio (e.g., a beep) indication 512. The STK will direct the smartphone to communicate the encrypted packet to the smart watch. In a second communicative relationship, the encrypted packet is delivered to the smart watch at 410A. In cases where the fifth act at 410A is not performed, an alternative fifth act 410B is performed to transfer the protocol. In these cases, the mobile network service provider 310 communicates directly with the second mobile device 312 smart watch to transfer information such as a challenge to permit transfer of the subscription to the smart watch. The smart watch may provide feedback to a user indicating transfer of the subscription at 514.

At 516, the STK operating within the security module of the smart watch begins activating the subscription by processing the encrypted packet received from the smartphone or the MNO. Only the smart watch is capable of decrypting the packet. Upon decryption, the STK of the smart watch will make changes to permit the activated subscription. A refresh command on the smart watch may awaken the baseband radio and begin communication with the mobile network service provider.

A sixth act 412 is initiated by the smart watch. The smart watch initiates a network session to complete the process of activating the subscription. The relationship between the mobile network service provider 310 and the smart watch is established. The MNO will perform internal procedures to confirm association of the smart watch at 518.

An optional seventh act 414 sends a disable packet to the smartphone first mobile device 302. At 512, the disable packet is processed and the smartphone may indicate to a user the transfer of its active subscription and "emergency only" status.

In an eighth act 416 and ninth act 418 that occur in cooperation with the sixth act, the mobile network service provider 310 verifies the activated subscription in the smart watch and enables access to mobile network services in the smart watch such that data transfer may occur. If the optional request to disassociate the smartphone was made at 406, then the mobile network service provider 310 will also deactivate the subscription or otherwise disable the smartphone's access to the mobile network services.

It is recognized that the process may be terminated at many points. If a particular act fails to complete, for example, the process may end, and the activated subscription may not be transferred. In another example, if the mobile network service provider detects a malicious attempt to transfer an activated subscription, the mobile network service provider may disable the activated subscription and prohibit the transfer.

Other optional actions may also be included in a process to transfer an activated subscription from one mobile device to another mobile device. For example, in one embodiment, the process of transferring the activated subscription is scheduled. Once initiated, the process will begin and the transfer will take place at some point in the future. Along these lines, a transfer of an activated subscription may in some cases be temporary. That is, a user may select a time period such as one hour, one week, or some other time frame. After the time period expires, the activated subscription in the slave device may be deactivated. In another example, the master device may remain a master device.

That is, within the exemplary use case described herein the master smartphone that initiated the transfer of the activated subscription to the slave smart watch may also initiate the re-transfer or return of the activated subscription back to the smartphone.

As discussed herein, still other embodiments are contemplated as within the scope of a portable subscription transfer between two smart device as illustrated in the present figures and described in the present disclosures. For example, in one embodiment, one smart device undertakes the process of transferring a subscription. Referring to FIG. 3, a first mobile device 302 is a smartphone, and a second mobile device 312 is a global positioning system (GPS) tracking device as may be attached to a motor vehicle, a shipping container, or any other type of vehicle or device that is desirably tracked. In this case, the first mobile device 302 can instantiate an STK via a display or other user input. The STK forms a communicative relationship with a portal application operated or otherwise directed by the mobile network service provider 310. Access through the portal may include entering a username and password, a PIN, or some other secure information thereby verifying to the network operator's satisfaction proper authority to transfer a portable subscription.

Through the STK and portal, the first mobile device 302 and the mobile network service provider 310 cooperate to transfer a subscription. The first mobile device can be manipulated by a user to enter identifying information associated with the GPS tracking device such as an IMSI, an MSISDN, an ICCID, IMEI, or the like via the portal. After this information is input, the mobile network service provider 310 can cooperate with the GPS tracker in a manner previously described to transfer the subscription. In some embodiments, only the same device that initially transfers the subscription (i.e., the first mobile device 302) is permitted to retrieve or otherwise re-transfer the subscription from the GPS tracking device. In other cases, a different mechanism can be used to transfer the subscription from second mobile device 312 (i.e., the GPS device), which may have no user interface or only a limited user interface.

In another example, a portable subscription is transferred through the MNO portal without input from any smart device. As discussed herein, if a user that is remote from either first mobile device 302 or the second mobile device 312 desires to transfer a portable subscription, the user may be able to access the mobile network service provider 310 portal via a different computing device. With proper credentials or other authorization, the user may enter information that identifies both the first mobile device 302 and the second mobile device 312. After entering the information, the mobile network service provider 310 will activate and deactivate the associated subscriptions as described herein. In this type of an embodiment, a business entity such as a shipping company or some other entity may be able to efficiently enable communications between several smart devices without requiring direct provisioning of each individual device. In a complimentary way, a mobile network service provider 310 may receive additional revenue from the entity above what each device may individually generate because the mobile network service provider 310 enables the easy transfer of such subscriptions.

As used herein, the term "module" refers to an electronic circuit, a processor (e.g., shared, dedicated, group, single core, multicore, or the like) and memory operative to execute one or more software or firmware programs, an application specific integrated circuit (ASIC), a combinational logic circuit, or some other individual or cooperative coupling of suitable components (either hardware or software) that provides the functionally described with respect to the module.

Non-limiting embodiments of computing device are referenced herein but not described in detail for the sake of brevity and simplicity. The computing devices are understood to include operative hardware found in a conventional computing apparatuses such as one or more central processing units (CPU's), volatile and non-volatile memory, serial and parallel input/output (I/O) circuitry compliant with various standards and protocols, wired and/or wireless networking circuitry (e.g., a communications transceiver), and the like.

Along these lines, processor 204 (i.e., a processing unit), as used in the present disclosure, refers to one or more processing units individually, shared, or in a group, having one or more processing cores (e.g., execution units), including central processing units (CPUs), digital signal processors (DSPs), microprocessors, micro controllers, state machines, and the like that execute instructions.

In the present disclosure, memory 202 may be used in one configuration or another. The memory 202 may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

Logic module 206 may include a contactless interface such as formed by near-field communications (NFC) logic, radio frequency identifier (RFID) logic, Bluetooth logic, low energy Bluetooth (BLe) logic, IEEE 802.11 (WiFi) logic, or some other electronic infrastructure. In some cases, the underlying logic (i.e., circuitry, software, protocols, and the like) conforms to parameters established by a standard setting body. In other cases, the underlying logic conforms to a proprietary interface. In addition, or in the alternative, logic module 206 may form or direct other operations in a mobile device such as input/output (I/O) functions to beep, buzz, vibrate, cause a message, or perform some other user interface feature.

In the present disclosure the term "mobile device" is used to indicate a device capable of communicating through a wireless communications network such as a cellular mobile device network, a satellite mobile device network, or some other mobile device network. It is understood that the device capable of such communication may itself be mobile or otherwise portable. Conversely, the device capable of such communication may be temporarily or permanently stationary.

The flowchart of FIG. 4 illustrates processes that may be used by embodiments of the devices described herein transferring an activated subscription from one mobile device to another mobile device. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to share a subscription for mobile network service between a first mobile device and a second mobile device, the subscription associated with a set of subscriber services provided by a network services provider, the subscription activated in the first mobile device, the method comprising:
    forming a first communicative relationship between the first mobile device and the second mobile device;
    wirelessly receiving at the first mobile device from the second mobile device, identification information associated with the second mobile device;
    passing the identification information associated with the second mobile device and a deactivation request from the first mobile device to the network services provider;

receiving at the first mobile device from the network services provider, confirmation that access to the subscription will be deactivated;

receiving at the first mobile device from the network services provider activation information associated with the second mobile device, wherein the activation information includes at least one challenge value formed by the network services provider using at least some of the identification information associated with the second mobile device;

forming a second communicative relationship between the first mobile device and the second mobile device;

passing the at least one challenge value from the first mobile device to the second mobile device via the second communicative relationship;

wirelessly communicating the activation information associated with the second mobile device from the first mobile device to the second mobile device; and confirming activation of the subscription in the second mobile device.

2. The method of claim 1, wherein the set of subscriber services includes communication of at least one of voice information, data, or text messages.

3. The method of claim 1, wherein the first and second mobile devices are in a master slave relationship and the first mobile device is a master.

4. The method of claim 1, wherein the subscription includes information stored in the first mobile device on a subscriber identity module (SIM) card.

5. The method of claim 1, wherein the first mobile device is a smartphone and the second mobile device is at least one of a smart watch, a portable media device, a smart device integrated in a motor vehicle, and a second smartphone.

6. The method of claim 1, wherein the first communicative relationship and the second communicative relationship are formed as near field communication (NFC) communicative relationships.

7. The method of claim 1, wherein the first communicative relationship and the second communicative relationship provide an indication to a user that the subscription is being transferred.

8. The method of claim 1, wherein the identification information associated with the second mobile device is at least one of an integrated circuit card identifier (ICCID), an International mobile subscriber or station identity (IMSI), and a mobile subscriber integrated services digital network number (MSISDN).

9. The method of claim 1, comprising:
performing an algorithm at the second mobile device using at least some of the activation information associated with the second mobile device to produce an authentication result; and
passing the authentication result and an activation request from the second mobile device to the network services provider.

10. A mobile network operator (MNO) system, comprising:
an MNO communication device, the MNO communication device arranged to communicate with a first mobile device and a second mobile device wherein communicated information includes:
a deactivation request from the first mobile device, the deactivation request associated with transfer of a portable subscription from the first mobile device to the second mobile device, the portable subscription associated with a set of subscriber services provided by the MNO;

identification information associated with the second mobile device;

confirmation information to the first mobile device indicating that the portable subscription will be deactivated at the first mobile device;

activation information associated with the second mobile device, wherein the activation information includes authentication challenge information to the first mobile device for the second mobile device, the authentication challenge information formed using the identification information associated with the second mobile device;

an activation request from the first mobile device and for the second mobile device, the activation request associated with transfer of the portable subscription from the first mobile device to the second mobile device, the activation request including authentication result information from the first mobile device and for the second mobile device formed using the authentication challenge information; and confirmation information to the second mobile device indicating that the portable subscription will be activated at the second mobile device.

11. The MNO system of claim 10, wherein the identification information associated with the second mobile device is at least one of an integrated circuit card identifier (ICCID), an International mobile subscriber or station identity (IMSI), and a mobile subscriber integrated services digital network number (MSISDN).

12. The MNO system of claim 10, wherein the communicated information includes:
confirmation information to the first mobile device indicating that the portable subscription will be deactivated at the first mobile device and activated at the second mobile device.

13. The MNO system of claim 10, wherein the communicated information includes:
data communicated from the second mobile device through the MNO system to another mobile device.

14. The MNO system of claim 10, wherein after the portable subscription is transferred from the first mobile device to the second mobile device, the first mobile device is only enabled to access emergency services of the MNO system.

15. A non-transitory computer-readable storage medium whose stored contents configure a mobile device to perform a method, the method comprising:
transferring a portable subscription from a first mobile device to a second mobile device, the portable subscription associated with a set of subscriber services provided by a network services provider, the portable subscription including portability information stored in a security module of the first mobile device, wherein transferring the portable subscription requires receiving at the first mobile device from the network services provider activation information associated with the second mobile device, the activation information including at least one challenge value formed by the network services provider using at least some identification information associated with the second mobile device, and wherein transferring the portable subscription further requires wirelessly passing the at least one challenge value from the first mobile device to the second mobile device.

16. The non-transitory computer-readable storage medium according to claim 15 whose stored contents configure the mobile device to perform the method, the method further comprising:
- forming a first communicative relationship between the first mobile device and a second mobile device;
- wirelessly receiving at the first mobile device from the second mobile device, identification information associated with the second mobile device; and
- passing the identification information associated with the second mobile device to the network services provider.

17. The non-transitory computer-readable storage medium according to claim 16 whose stored contents configure the mobile device to perform the method, the method further comprising:
- forming a second communicative relationship between the first mobile device and the second mobile device;
- wirelessly communicating activation information associated with the second mobile device from the first mobile device to the second mobile device; and
- confirming de-activation of the portable subscription in the first mobile device.

18. The non-transitory computer-readable storage medium according to claim 15 wherein the first mobile device is a smartphone.

19. The non-transitory computer-readable storage medium according to claim 15 wherein the security module is a subscriber identity module (SIM) card.

* * * * *